United States Patent
Yang et al.

(10) Patent No.: US 8,890,648 B2
(45) Date of Patent: Nov. 18, 2014

(54) CONNECTING ELEMENT FOR SECONDARY BATTERY, AND BATTERY MODULE AND BATTERY PACK INCLUDING THE SAME

(71) Applicant: LG Chem, Ltd., Seoul (KR)

(72) Inventors: Jung-Hoon Yang, Daejeon (KR); Young-Suk Cho, Daejeon (KR); Seung-Don Choi, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/963,373

(22) Filed: Aug. 9, 2013

(65) Prior Publication Data

US 2014/0038471 A1  Feb. 6, 2014

Related U.S. Application Data

(63) Continuation of application No. PCT/KR2012/011376, filed on Dec. 24, 2012.

(30) Foreign Application Priority Data

Aug. 2, 2012  (KR) .................. 10-2012-0084944
Dec. 21, 2012  (KR) .................. 10-2012-0150600

(51) Int. Cl.
*H01H 85/06* (2006.01)
*H01H 85/08* (2006.01)
*H01H 85/055* (2006.01)
*H01M 2/10* (2006.01)

(52) U.S. Cl.
CPC .................................. *H01M 2/1016* (2013.01)
USPC .......... 337/181; 337/158; 337/159; 337/186; 337/187

(58) Field of Classification Search
USPC .......................... 337/158, 159, 186, 181, 187
See application file for complete search history.

(56) References Cited

U.S. PATENT DOCUMENTS

| 950,932 | A | * | 3/1910 | Lehmann | 337/186 |
| 2,729,802 | A | * | 1/1956 | Jordan et al. | 439/830 |
| 4,315,235 | A | * | 2/1982 | Jacobs, Jr. | 337/296 |
| 5,120,617 | A | * | 6/1992 | Cameron | 429/7 |
| 5,898,357 | A | * | 4/1999 | Endo et al. | 337/159 |
| 5,976,729 | A | * | 11/1999 | Morishita et al. | 429/65 |

(Continued)

FOREIGN PATENT DOCUMENTS

| JP | 05041205 A | 2/1993 |
| JP | 2007280898 A | 10/2007 |

(Continued)

*Primary Examiner* — Anatoly Vortman
(74) *Attorney, Agent, or Firm* — Lerner, David, Littenberg, Krumholz & Mentlik, LLP (57) ABSTRACT

A connecting element for a secondary battery is installed along a path of current flowing through a secondary battery to electrically connect components and includes a first metal plate having a first protrusion formed to protrude at one side end thereof from the center portion with respect to a direction along the thickness of the first metal plate, a second metal plate located spaced apart from the first metal plate with a gap being formed therebetween and having a second protrusion formed to protrude at one side end thereof from the center portion with respect to a direction along the thickness of the second metal plate and configured to face the first protrusion, and an alloy bridge made of alloy material having a melting point lower than those of the first metal plate and the second metal plate and formed to fill the gap.

19 Claims, 6 Drawing Sheets

(56) References Cited

U.S. PATENT DOCUMENTS

| | | | |
|---|---|---|---|
| 6,162,098 A * | 12/2000 | Cheng et al. | 439/620.29 |
| 6,163,244 A * | 12/2000 | Endo et al. | 337/160 |
| 6,294,978 B1 * | 9/2001 | Endo et al. | 337/166 |
| 6,448,882 B1 * | 9/2002 | Inaba et al. | 337/227 |
| 6,492,058 B1 * | 12/2002 | Watanabe et al. | 429/121 |
| 6,507,265 B1 * | 1/2003 | Ackermann | 337/278 |
| 6,509,824 B2 * | 1/2003 | Inaba et al. | 337/295 |
| 6,512,443 B1 * | 1/2003 | Matsumura et al. | 337/189 |
| 6,556,122 B2 * | 4/2003 | Izaki et al. | 337/405 |
| 6,576,838 B2 * | 6/2003 | Matsumura | 174/66 |
| 6,607,860 B2 * | 8/2003 | Hulbert et al. | 429/178 |
| 6,622,375 B1 * | 9/2003 | Endo et al. | 29/623 |
| 6,806,421 B2 * | 10/2004 | Matsumura | 174/50 |
| 6,855,008 B1 * | 2/2005 | Freitag et al. | 439/620.26 |
| 6,929,879 B2 * | 8/2005 | Yamazaki | 429/158 |
| 6,936,374 B2 * | 8/2005 | Ehara | 429/90 |
| 7,312,688 B2 * | 12/2007 | Ely et al. | 337/160 |
| 7,462,417 B2 * | 12/2008 | Moon | 429/90 |
| 7,488,213 B2 * | 2/2009 | Plummer | 439/620.33 |
| 7,638,237 B2 * | 12/2009 | Ha et al. | 429/152 |
| 7,642,746 B2 * | 1/2010 | Kim et al. | 320/112 |
| 7,924,137 B2 * | 4/2011 | Rahman et al. | 337/187 |
| 2001/0011939 A1 * | 8/2001 | Inaba et al. | 337/265 |
| 2002/0163416 A1 * | 11/2002 | Matsumura | 337/112 |
| 2002/0167390 A1 * | 11/2002 | Matsumura et al. | 337/161 |
| 2004/0126651 A1 * | 7/2004 | Kim et al. | 429/61 |
| 2005/0116806 A1 * | 6/2005 | Iwata | 337/188 |
| 2006/0044728 A1 * | 3/2006 | Kim et al. | 361/103 |
| 2011/0237139 A1 * | 9/2011 | Lee et al. | 439/754 |
| 2013/0236752 A1 * | 9/2013 | Yang et al. | 429/61 |

FOREIGN PATENT DOCUMENTS

| | | |
|---|---|---|
| JP | 2008177084 A | 7/2008 |
| KR | 20060010659 A | 2/2006 |
| KR | 20080100980 A | 11/2008 |
| KR | 20100041505 A | 4/2010 |

* cited by examiner

CONNECTING ELEMENT FOR SECONDARY BATTERY, AND BATTERY MODULE AND BATTERY PACK INCLUDING THE SAME

CROSS-REFERENCE TO RELATED APPLICATION

The present application is a continuation of International Application No. PCT/KR2012/011376 filed on Dec. 24, 2012, which claims priority to Korean Patent Application No. 10-2012-0084944 filed on Aug. 2, 2012, and Korean Patent Application No. 10-2012-0150600 filed on Dec. 21, 2012, in the Republic of Korea, the disclosures of which are incorporated herein by reference.

TECHNICAL FIELD

The present disclosure relates to a secondary battery, and more particularly, a connecting element for a secondary battery, which may improve the safety of the secondary battery, and a battery module and a battery pack including the same.

BACKGROUND ART

As portable electric products such as video cameras, portable phones and portable PC are more actively used, the importance of a secondary battery generally used as a driving source of such a portable electric product is increasing.

Different from a primary battery which may not be charged, a secondary battery allows charging and discharging and is actively studied in high-tech industries such as digital cameras, cellular phones, laptop computers, power tools, electric bicycles, electric vehicles, hybrid vehicles, mass-capacity power storage device or the like.

In particular, the use of a lithium secondary battery is gaining since it has a high energy density per unit weight and allows rapid charging in comparison to other existing secondary batteries such as lead storage batteries, nickel-cadmium batteries, nickel-hydrogen batteries, nickel-zinc batteries or the like.

The lithium secondary battery has an operating voltage of 3.6V or above and is used as a power source of a portable electronic device. In other cases, a plurality of batteries are connected in series or in parallel and used for high-power electric vehicles, hybrid vehicles, power tools, electric bicycles, power storage devices, UPS or the like.

The lithium secondary battery has a triple operating voltage in comparison to nickel-cadmium batteries or nickel-metal hydride batteries and is used more and more due to its high energy density per unit weight.

Depending on the kind of electrolyte, a lithium secondary battery may be classified into a lithium ion battery using a liquid electrolyte and a lithium ion polymer battery using a solid electrolyte. In addition, depending on the kind of polymer solid electrolyte, the lithium ion polymer battery may be classified into an all solid lithium ion polymer battery containing no electrolyte and a lithium ion polymer battery using a gel-type polymer electrolyte containing an electrolyte.

Lithium ion batteries using a liquid electrolyte mostly use a cylindrical or rectangular metal can as a container and are sealed therein by welding. A can type secondary battery using such a metal can as a container has a fixed shape and thus limits the design of an electric product which uses the battery as a power source. In addition, it is difficult to decrease the volume of the product. Therefore, a pouch type secondary battery prepared by putting an electrode assembly and an electrolyte into a pouch package made of a film and then sealing the same has been developed and used.

However, the lithium secondary battery may explode when being overheated, and so issues of ensuring safety are of major concern. The lithium secondary battery may be overheated due to various factors, of which an example is a case in which an overcurrent exceeding a limit flows through the lithium secondary battery. If an overcurrent flows, the lithium secondary battery generates Joule's heat and thus an internal temperature of the battery rapidly increases. In addition, the rapid increase of temperature causes a decomposition reaction of the electrolyte and thermal runaway, which may lead to explosion of the battery. An overcurrent may occur when a sharp metallic matter pierces the lithium secondary battery, when an insulation between a cathode and an anode breaks due to the shrinkage of a separator interposed between the cathode and the anode, when a rush current is applied to the battery due to an abnormal charging circuit or a load connected to the outside, or the like.

Therefore, the lithium secondary battery is coupled to a protection circuit in order to protect the battery against abnormal states such as the occurrence of an overcurrent. The protection circuit generally includes a fuse element which irreversibly disconnects a line where a charging or discharging current flows when an overcurrent occurs.

Figure 1:
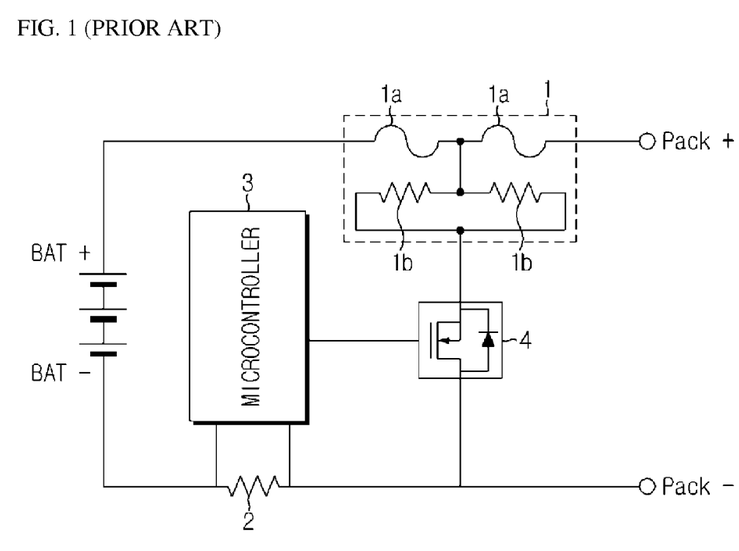
FIG. 1 is a circuit diagram for illustrating an arrangement and an operating mechanism of a fuse element employed in a protection circuit coupled to a battery module.

FIG. 1 is a circuit diagram for illustrating an arrangement and an operating mechanism of a fuse element employed in a protection circuit coupled to a battery pack which includes a lithium secondary battery.

As shown in FIG. 1, a protection circuit includes a fuse element 1, a sensing resistor 2 for sensing an overcurrent, a microcontroller 3 for monitoring an occurrence of an overcurrent and operating the fuse element 1 when an overcurrent occurs, and a switch 4 for switching the flow of an operating current to the fuse element 1.

The fuse element 1 is installed along a main line connected to the outermost terminal of the battery pack. The main line represents a wire through which a charging current or a discharging current flows. In FIG. 1, it is depicted that the fuse element 1 is installed along a high potential line (Pack+).

The fuse element 1 is a three-terminal element, in which two terminals are connected to the main line through which a charging or discharging current flows and one terminal is connected to the switch 4. In addition, the fuse element includes a fuse 1a connected to the main line in series and disconnected at a specific temperature and a resistor 1b for applying heat to the fuse 1a.

The microcontroller 3 monitors the occurrence of an overcurrent by periodically detecting voltages at both ends of the sensing resistor 2, and turns on the switch 4 if it is determined that an overcurrent occurs. In this case, the current flowing through the main line flows to the fuse element 1 by bypassing sensing resistor 2 and the battery pack and is applied to the resistor 1b. Accordingly, the Joule's heat generated at the resistor 1b is conducted to the fuse 1a to raise the temperature of the fuse 1a. If the temperature of the fuse 1a increases to a melting temperature, the fuse 1a is fused to irreversibly cut the main line. If the main line is cut, the overcurrent does not flow any more, which solves problems caused from the overcurrent.

However, the above techniques have several problems. For example, if the microcontroller 3 malfunctions, even though an overcurrent occurs, the switch 4 does not turn on. In this case, a current is not applied to the resistor 1b of the fuse element 1, and therefore the fuse element 1 does not operate. In addition, a space for disposing the fuse element 1 should be separately provided in the protection circuit, and a program algorithm for controlling operations of the fuse element 1 should be loaded on the microcontroller 3. Therefore, the spatial efficiency of the protection circuit deteriorates, and the load of the microcontroller 3 increases.

DISCLOSURE

Technical Problem

The present disclosure is designed to solve the problems of the related art, and therefore the present disclosure is directed to providing a new connecting element for a secondary battery, which is required for giving an overcurrent interrupting function to a secondary battery, separate from an overcurrent interrupting function of a protection circuit, and also a battery module and a battery pack including the same.

Technical Solution

In one aspect of the present disclosure, there is provided a connecting element for a secondary battery, which is installed along a path of current flowing through a secondary battery to electrically connect components, the connecting element including: a first metal plate having a first protrusion formed to protrude at one side end thereof from the center portion with respect to a direction along the thickness of the first metal plate; a second metal plate located spaced apart from the first metal plate with a gap being formed therebetween and having a second protrusion formed to protrude at one side end thereof from the center portion with respect to a direction along the thickness of the second metal plate and configured to face the first protrusion; and an alloy bridge made of alloy material having a melting point lower than those of the first metal plate and the second metal plate and formed to fill the gap.

The first metal plate and the second metal plate may be located in parallel on the same plane.

The surface of the alloy bridge may conform to the surfaces of the first metal plate and the second metal plate.

The first protrusion and the second protrusion may be formed so that surfaces thereof which face each other are parallel to each other.

The surfaces of the first protrusion and the second protrusion, which face each other, may be inclined in opposite directions.

The surfaces of the first protrusion and the second protrusion, which face each other, may be formed convex to protrude toward each other.

Each of the surfaces of the first protrusion and the second protrusion, which face each other, may have a rectangular shape or a round shape.

The alloy bridge may be made of lead-free material containing tin and copper.

The content of the tin may be 80 to 98 wt % and the content of the copper may be 2 to 20 wt %, based on the entire weight of the lead-free alloy.

The lead-free alloy further may include at least one additional metal selected from the group consisting of nickel, zinc and silver.

The content of the additional metal may be 0.01 to 10 wt %, based on the entire weight of the lead-free alloy.

The lead-free alloy may have a melting point of 100° C. to 250° C.

In another aspect of the present disclosure, there is also provided a battery module, which includes a plurality of unit cells electrically connected to each other, an outer case for accommodating the unit cells, an external terminal protruding out of the outer case, and a bus bar for connecting the unit cells to the external terminal, wherein the bus bar is the connecting element for a secondary battery according to the present disclosure.

In another aspect of the present disclosure, there is also provided a battery pack, which includes a plurality of battery modules and an inter bus bar for electrically connecting the battery modules, wherein the inter bus bar is the connecting element for a secondary battery according to the present disclosure.

Advantageous Effects

According to an aspect of the present disclosure, if an overcurrent flows through a secondary battery since a protection circuit does not operate normally, a connecting element for the secondary battery installed along a current path of the secondary battery is rapidly broken to ensure the safety of the secondary battery in use.

According to another aspect of the present disclosure, it is possible to minimize the increase of resistance caused by applying the connecting element for a secondary battery.

According to another aspect of the present disclosure, even though the connecting element applied to a secondary battery has relatively great thickness, it is possible to sufficiently ensure the safety against an overcurrent.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings in which.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

A connecting element for a secondary battery 10 according to an embodiment of the present disclosure will be described with reference to FIGS. 2 to 6.

Figure 2:
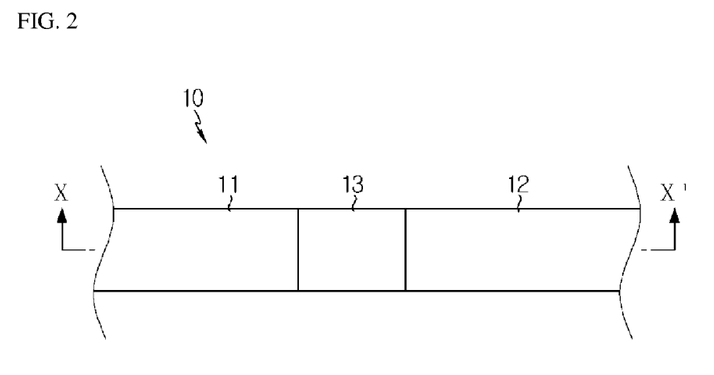
FIG. 2 is a plane view showing a connecting element for a secondary battery according to an embodiment of the present disclosure.
Figure 3:
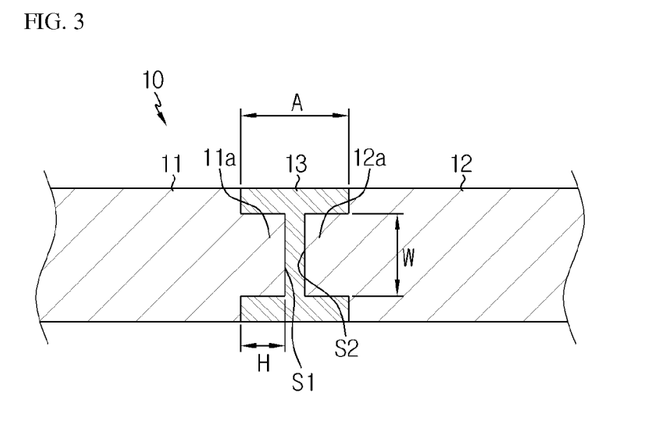
FIG. 3 is a cross-sectional view showing the connecting element for a secondary battery, taken along the line X-X' of FIG. 2.
Figure 4:
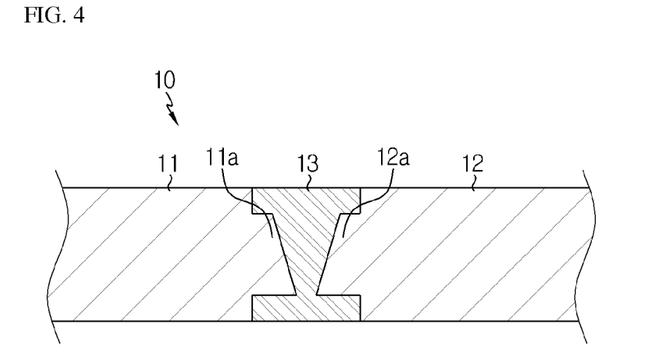
FIGS. 4 to 6 are cross-sectional views showing modifications of the connecting element for a secondary battery depicted of FIG. 3.
Figure 5:
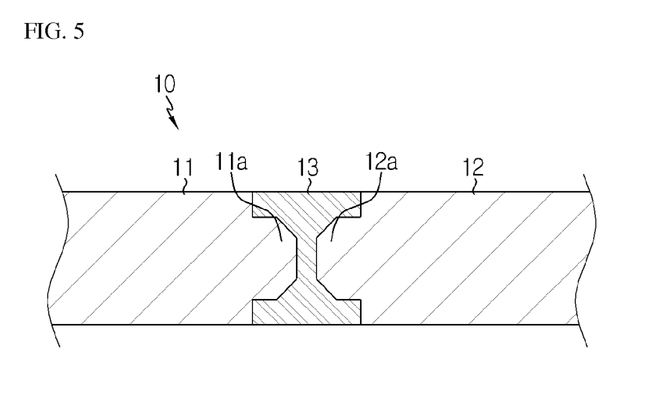
Figure 6:
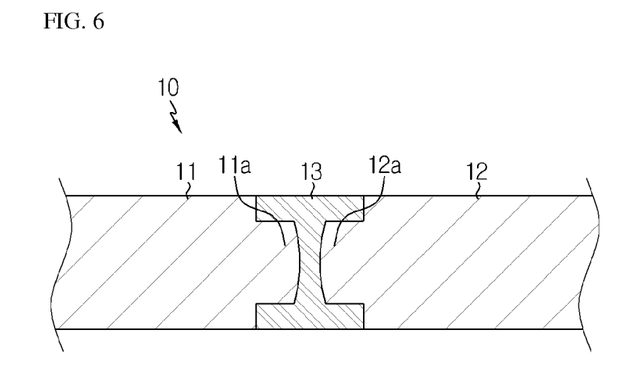

FIG. 2 is a plane view showing a connecting element for a secondary battery according to an embodiment of the present disclosure, FIG. 3 is a cross-sectional view showing the connecting element for a secondary battery, taken along the line X-X' of FIG. 2, and FIGS. 4 to 6 are cross-sectional views showing modifications of the connecting element for a secondary battery depicted of FIG. 3.

Referring to FIGS. 2 to 6, the connecting element 10 for a secondary battery according to the present disclosure includes a first metal plate 11, a second metal plate 12 and an alloy bridge 13.

The first metal plate 11 and the second metal plate 12 are thin plate-shaped metals and located in parallel on the same plane with a gap being formed between them.

The first metal plate 11 includes a first protrusion 11a formed to protrude from a center portion of one side end of the first metal plate 11. The second metal plate 12 includes a second protrusion 12a formed to protrude from a center portion of one side end of the second metal plate 12. Here, the second protrusion 12a faces the first protrusion 11a.

Height H and width W of the protrusions 11a, 12a influence characteristics of the connecting element 10 for a secondary battery, such as electric conductivity, safety against an overcurrent (easy break) and tensile strength.

For example, when the width at which the alloy bridge 13 is formed, namely the width of a joint area A, is fixed, if the height H increases, the electric conductivity of a component improves but the safety against an overcurrent and the tensile strength deteriorate. Similarly, if the width of the joint area A is fixed, if the width W increases, the electric conductivity of a component deteriorates but the safety against an overcurrent and the tensile strength tend to improve.

In another point of view, when the distance between one pair of protrusions 11a, 12a is fixed, if the height H increases, the electric conductivity of a component decreases but the safety against an overcurrent and the tensile strength are improved. Similarly, when the distance between one pair of protrusions 11a, 12a is fixed, if the width W increases, the electric conductivity of a component improves but the safety against an overcurrent and the tensile strength tend to deteriorate.

This is because the metals used in the metal plates 11, 12 have improved electric conductivity in comparison to the alloy used for the alloy bridge 13, but also have much higher melting points and bad ductility. Therefore, by suitably adjusting the height H and the width W of the protrusions 11a, 12a, it is possible to obtain the connecting element 10 for a secondary battery, which has excellent properties and may be rapidly broken when an overcurrent flows.

The facing surfaces S1, S2 of the protrusions 11a, 12a may have various shapes. In other words, the facing surfaces S1, S2 may be substantially planar and substantially perpendicular to the length direction of the metal plates 11, 12. Facing surfaces S1, S2 can be parallel to each other (see FIG. 3) or inclined in opposite directions (see FIG. 4). In addition, the facing surfaces S1, S2 may be convexly shaped to protrude toward each other, having a rectangular shape (see FIG. 5) or a round shape (see FIG. 6).

Meanwhile, even though the shapes of the facing surfaces S1, S2 of the protrusions 11a, 12a have been described based on the structures depicted in FIGS. 2 to 6, the present disclosure is not limited thereto. In other words, the facing surfaces S1, S2 may have various shapes, for example being inclined in the same direction, being concavely depressed toward the inside of the metal plates 11, 12, or having a repetition of hills and valleys.

The metal plates 11, 12 are generally made of copper (Cu) or aluminum (Al), but the material of the metal plates 11, 12 of the present disclosure is not limited thereto, and various conductive metallic materials may be applied.

The kind of material may vary depending on the material of parts coupled to the metal plates 11, 12. In other words, the metal plates 11, 12 may be made of the same material as parts coupled thereto, which may be advantageous in improving weldability and minimizing a contact resistance. Depending on the material of parts coupled thereto, the first metal plate 11 and the second metal plate 12 may also be made of different metallic materials.

The alloy bridge 13 is made of an alloy material having a lower melting point than the metal plates 11, 12 and fills the gap formed between the metal plates 11, 12. The outer surface of the alloy bridge 13 may conform to the surfaces of the first metal plate 11 and the second metal plate 12 so that the alloy bridge 13 may be rapidly melted when an overcurrent flows at the connecting element 10 for a secondary battery.

The alloy used for the alloy bridge 13 has a melting point of about 100° C. to 250° C., which is lower than the melting point of the metal plates 11, 12, and is made of a lead-free alloy which contains tin (Sn) and copper (Cu) as main components and does not contain lead (Pb) harmful to environments and human bodies.

The melting point range of the alloy used for the alloy bridge 13 is set in consideration of the level of an overcurrent to be interrupted. If the melting point of the alloy is lower than 100° C., the alloy may be melted when a normal current flows at the secondary battery to which the connecting element 10 is applied. In addition, if the melting point of the alloy is higher than 250° C., the alloy may not be rapidly melted and therefore cannot effectively interrupt an overcurrent.

Among the components of the alloy, tin influences the melting point and the tensile strength of the alloy. The content of tin is adjusted to be about 80 wt % or above, preferably in the range of about 85 to 98 wt % so that the alloy may have a melting point of about 100 to 250° C. and good tensile strength. Copper improves electric conductivity of the alloy. If putting this function into consideration, the content of copper is adjusted in the range of about 2 to 20 wt %, preferably in the range of about 4 to 15 wt %. Here, wt % is a unit based on the entire weight of the alloy used for the alloy bridge 13, throughout this specification.

If the contents of tin and copper are adjusted to be in suitable ranges as described above, the alloy used for the alloy bridge 13 may have good tensile strength, and the increase of resistance of the connecting element 10 for a secondary battery, caused by the alloy bridge 13, may be controlled.

The alloy bridge 13 may further include a metal with good electric conductivity such as nickel (Ni), silver (Ag), zinc (Zn) or the like as an additional alloy component in addition to tin and copper in order to have improved properties. The content of the additional alloy component is preferably about 0.01 to 10 wt % in comparison to the entire weight of the alloy.

As described above, the connecting element 10 for a secondary battery has a dual structure in which a metal having relatively excellent conductivity and an alloy having a relatively low metal point are combined, thereby simultaneously ensuring both excellent conductivity and rapid break against an overcurrent.

In addition, since the connecting element 10 for a secondary battery has the protrusions 11a, 12a as described above, a sufficient fusing effect may be ensured even though the connecting element 10 is used as a relatively thick part such as a bus bar or an inter bus bar.

In other words, if the connecting element 10 for a secondary battery has a relatively large thickness, the connecting element may not be perfectly broken by fusing. However, since the height H and the width W of the protrusions 11a, 12a are suitably adjusted to maximize a resistance value in the joint area A within an allowable range, a sufficient fusing effect may be provided while minimizing sacrifice of other properties (tensile strength, electric conductivity, or the like) (see FIG. 3).

Next, a battery module M to which the connecting element 10 for a secondary battery is applied according to the present disclosure will be described with reference to FIG. 7.

Figure 7:
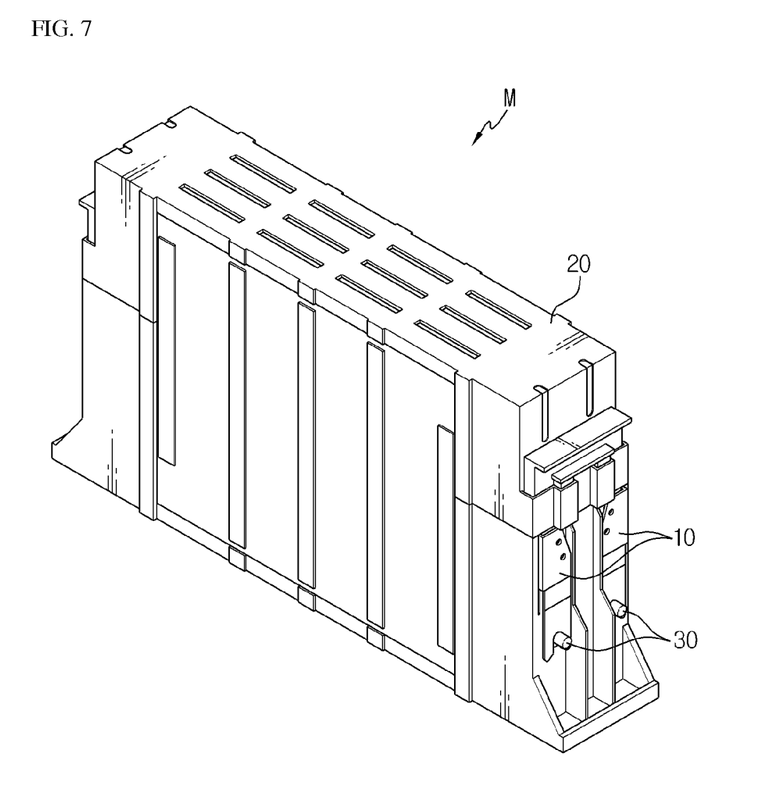
FIG. 7 is a perspective view showing a battery module according to the present disclosure.

FIG. 7 is a perspective view showing a battery module according to the present disclosure.

Referring to FIG. 7, the battery module M according to the present disclosure includes a plurality of unit cells (not shown) connected in series and/or in parallel, an outer case 20 for accommodating the unit cells, an external terminal 30 exposed out of the outer case 20, and a bus bar 10 for connecting the unit cells to the external terminal 30.

In other words, the battery module M may effectively interrupt an overcurrent and prevent a resistance value in a circuit from excessively increasing by providing a bus bar to which the connecting element 10 for a secondary battery according to the present disclosure is applied.

In particular, if the plurality of unit cells is connected in series, the dangerousness caused by an overcurrent and the power loss caused by an increase of resistance may be magnified further. However, by applying the connecting member 10 for a secondary battery in which the height H and the width W of the protrusions 11a, 12a are suitably adjusted as a bus bar, the safety against an overcurrent and the low resistance may be ensured simultaneously.

Next, a battery pack P to which the connecting element 10 for a secondary battery is applied according to the present disclosure will be described with reference to FIGS. 8 and 9.

Figure 8:
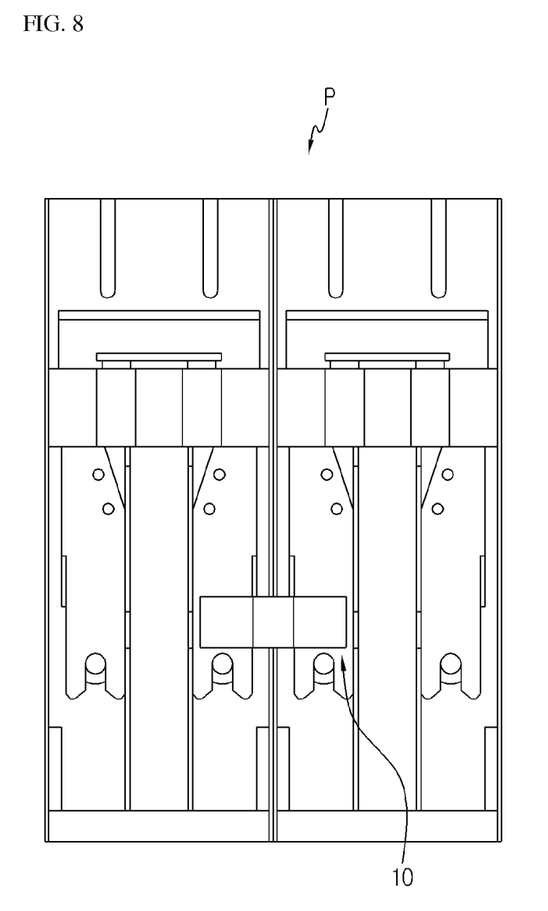
FIGS. 8 and 9 are perspective views showing a battery pack according to the present disclosure.
Figure 9:
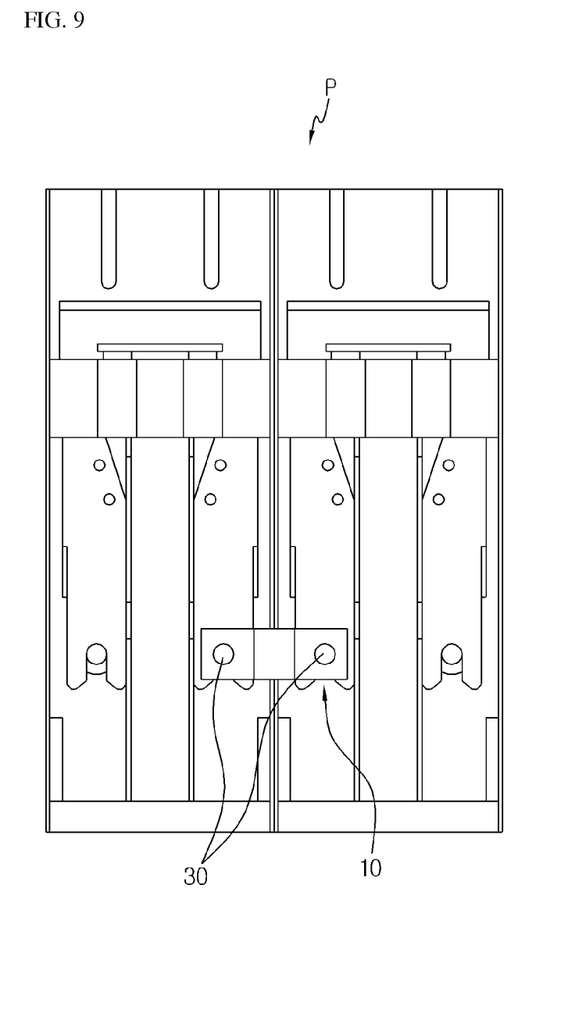

FIGS. 8 and 9 are perspective views showing a battery pack according to the present disclosure.

Referring to FIGS. 8 and 9, the battery pack P according to the present disclosure includes a plurality of battery modules, and an inter bus bar 10 for connecting the plurality of battery modules in series and/or in parallel. The inter bus bar 10 connects bus bars of battery modules adjacent to each other (see FIG. 8) or connects external terminals (see FIG. 9) so that battery modules are electrically connected to each other.

In other words, the battery pack P may effectively interrupt an overcurrent and prevent a resistance value in a circuit from excessively increasing by providing an inter bus bar to which the connecting element 10 for a secondary battery according to the present disclosure is applied.

In particular, if the plurality of battery modules is connected in series, the dangerousness caused by an overcurrent and the power loss caused by an increase of resistance may be magnified further. However, by applying the connecting member 10 for a secondary battery according to the present disclosure as an inter bus bar, the safety against an overcurrent and the low resistance may be ensured simultaneously.

Meanwhile, the battery module in the battery pack P may be a battery module M to which the connecting element 10 for a secondary battery according to the present disclosure is applied as a bus bar or a battery module to which a general bus bar is applied.

Figure 10:
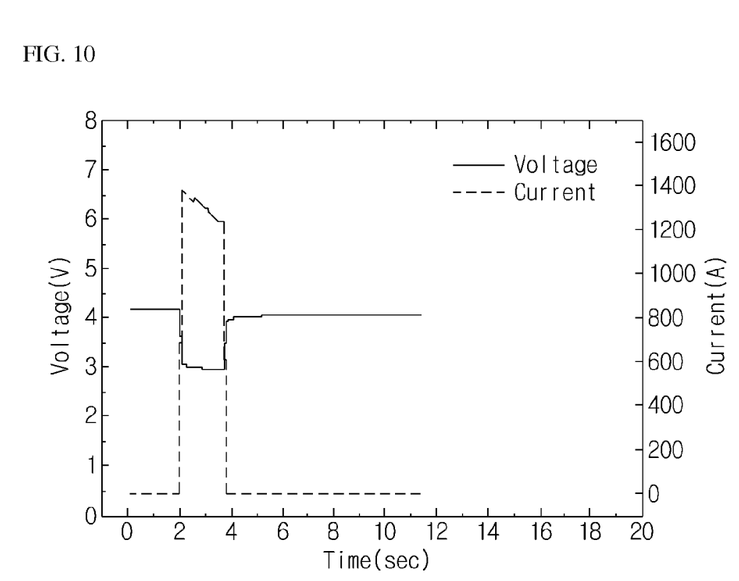
FIG. 10 is a graph showing short-circuit experiment results for the battery pack according to the present disclosure.

FIG. 10 shows short-circuit experiment results for the battery pack P to which the connecting element 10 for a secondary battery according to the present disclosure is applied. In the experiment, a short circuit was generated between both terminals of a battery pack P to which two battery modules are connected, and then the time at which an inter bus bar to which the connecting element 10 for a secondary battery is applied is broken was measured.

The graph shows that a current flow was interrupted about 2 seconds after a point when an overcurrent occurs (a point when 2 seconds have passed after the experiment was initiated) due to the occurrence of a short circuit. Therefore, it may be understood that the connecting element 10 for a secondary battery according to the present disclosure is rapidly broken when an overcurrent occurs.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A connecting element for a secondary battery, which is installed along a path of current flowing through the secondary battery to electrically connect components, the connecting element comprising:
   a first metal plate having a first side end and a first protrusion formed to protrude from a center portion of the first side end;
   a second metal plate spaced apart from the first metal plate by a gap, the second metal plate having a second side end and a second protrusion formed to protrude from a center portion of the second side end and configured to face the first protrusion; and
   an alloy bridge made of alloy material having a melting point lower than those of the first metal plate and the second metal plate,
   wherein the alloy material, in a condition in which the alloy material is below the melting point thereof, is formed to fill the gap and to conform to contours of the first and second protrusions, and
   wherein an outer surface of the alloy bridge conforms to surfaces of the first metal plate and the second metal plate adjacent the first and second protrusions, respectively.

2. The connecting element for a secondary battery according to claim 1,
   wherein the first metal plate and the second metal plate are located in parallel on the same plane.

3. The connecting element for a secondary battery according to claim 1,
   wherein the first protrusion and the second protrusion are formed so that surfaces thereof which face each other are parallel to each other.

4. The connecting element for a secondary battery according to claim 1,
   wherein the first protrusion and the second protrusion are formed so that surfaces thereof which face each other are inclined in opposite directions.

5. The connecting element for a secondary battery according to claim 1,
   wherein the first protrusion and the second protrusion are formed so that surfaces thereof which face each other are convex and protrude toward each other.

6. The connecting element for a secondary battery according to claim 5, wherein each of the surfaces of the first protrusion and the second protrusion which face each other has a rectangular shape.

7. The connecting element for a secondary battery according to claim 1,
wherein the alloy material is lead-free material containing tin and copper.

8. The connecting element for a secondary battery according to claim 7,
wherein the content of the tin is 80 to 98 wt % and the content of the copper is 2 to 20 wt %, based on the entire weight of the lead-free material.

9. The connecting element for a secondary battery according to claim 8,
wherein the lead-free material further includes at least one additional metal selected from the group consisting of nickel, zinc and silver.

10. The connecting element for a secondary battery according to claim 9,
wherein the content of the at least one additional metal is 0.01 to 10 wt %, based on the entire weight of the lead-free material.

11. The connecting element for a secondary battery according to claim 1,
wherein the alloy material has a melting point of 100° C. to 250° C.

12. A battery module comprising:
a plurality of unit cells electrically connected to each other,
an outer case for accommodating the unit cells,
an external terminal protruding out of the outer case, and
the connecting element of claim 1 as a bus bar for connecting the unit cells to the external terminal.

13. A battery pack comprising:
a plurality of battery modules, and
the connecting element of claim 1 as an inter bus bar for electrically connecting the battery modules.

14. The connecting element for a secondary battery according to claim 5,
wherein each of the surfaces of the first protrusion and the second protrusion which face each other has a round shape.

15. The connecting element for a secondary battery according to claim 1, wherein:
the first side end of the first metal plate extends between a first upper surface and a first lower surface of the first metal plate and has a first width defined by the first upper and first lower surfaces, and
the alloy material has the melting point lower than those of the first metal plate and the second metal plate fills a space defined between the first and second ends and the first and second protrusions, the space having a width substantially equal to the first width.

16. The connecting element for a secondary battery according to claim 1, wherein:
the first side end of the first metal plate extends in a width direction between a first upper surface and a first lower surface of the first metal plate,
a width of the first protrusion in the width direction is less than a width of the first metal plate in the width direction, and
the alloy material of the alloy bridge conforms to portions of the first side end adjacent the first protrusion.

17. A connecting element for a secondary battery, which is installed along a path of current flowing through the secondary battery to electrically connect components, the connecting element comprising:
a first metal plate having a first side end and a first protrusion formed to protrude from the first side end, the first side end extending between a first upper surface and a first lower surface of the first metal plate and having a first width defined by the first upper and first lower surfaces;
a second metal plate spaced apart from the first metal plate by a gap, the second metal plate having a second side end and a second protrusion formed to protrude from the second side end and configured to face the first protrusion; and
an alloy bridge made of alloy material having a melting point lower than those of the first metal plate and the second metal plate,
wherein the alloy material, in a condition in which the alloy material is below the melting point thereof, is formed to fill the gap and to fill a space defined between the first and second side ends and the first and second protrusions, the space having a width substantially equal to the first width.

18. The connecting element for a secondary battery according to claim 17,
wherein the first protrusion and the second protrusion are formed so that surfaces thereof which face each other are parallel to each other.

19. The connecting element for a secondary battery according to claim 17,
wherein the first protrusion and the second protrusion are formed so that surfaces thereof which face each other are inclined in opposite directions.

* * * * *